United States Patent
Doerksen et al.

(10) Patent No.: US 9,598,141 B1
(45) Date of Patent: Mar. 21, 2017

(54) THERMALLY ENHANCED HUB MOTOR

(71) Applicant: Future Motion, Inc., Santa Cruz, CA (US)

(72) Inventors: Kyle Jonathan Doerksen, Santa Cruz, CA (US); Dan Blachinsky, Santa Cruz, CA (US); Julian de la Rua, Santa Cruz, CA (US); Clyde Hancock, Seminole, FL (US)

(73) Assignee: Future Motion, Inc., Santa Cruz, CA (US)

( * ) Notice: Subject to any disclaimer, the term of this patent is extended or adjusted under 35 U.S.C. 154(b) by 0 days.

(21) Appl. No.: 15/063,071

(22) Filed: Mar. 7, 2016

(51) Int. Cl.
*B62K 1/00* (2006.01)
*B62M 7/12* (2006.01)

(52) U.S. Cl.
CPC ............. *B62M 7/12* (2013.01); *B62K 1/00* (2013.01)

(58) Field of Classification Search
CPC ..... A63C 17/01; A63C 17/014; A63C 17/016; A63C 17/08; A63C 17/12; A63C 17/015; A63C 17/26
See application file for complete search history.

(56) References Cited

U.S. PATENT DOCUMENTS

| | | |
|---|---|---|
| 1,585,258 A | 5/1926 | Moore |
| 2,873,515 A * | 2/1959 | Winstrom ............ H02K 15/066 29/732 |
| D233,619 S | 11/1974 | Kelling |
| 4,106,786 A * | 8/1978 | Talbott .................. A63C 17/01 280/205 |
| 4,109,741 A * | 8/1978 | Gabriel .................... B62M 7/12 180/21 |
| 4,241,931 A * | 12/1980 | Healy .................... B62K 17/00 280/205 |
| 4,740,001 A * | 4/1988 | Torleumke ............... B62K 1/00 280/11.115 |
| 4,795,181 A | 1/1989 | Armstrong |
| 4,997,196 A | 3/1991 | Wood |
| 5,119,277 A | 6/1992 | Copley et al. |
| 5,132,883 A | 7/1992 | La Lumandier |
| 5,341,892 A * | 8/1994 | Hirose ..................... B62M 6/60 180/220 |

(Continued)

FOREIGN PATENT DOCUMENTS

WO 2009/071879 A9 6/2009

OTHER PUBLICATIONS

Sep. 11, 2014, International Search Report of the International Searching Authority from the U.S. Receiving Office, in PCT Patent Application PCT/US2014/036244, which is an international application of Applicant Future Motion, Inc.

(Continued)

*Primary Examiner* — Erez Gurari
(74) *Attorney, Agent, or Firm* — Kolisch Hartwell, P.C.

(57) ABSTRACT

Apparatuses and methods relating to hub motors having enhanced thermal characteristics may include a hub motor having a stator comprising steel and a central axle (e.g., a mandrel and shaft) comprising a material with a substantially higher thermal conductivity than the stator (e.g., aluminum). Heat may be transferred from the stator through the axle of the motor to an outside heat sink. Manufacturing of thermally enhanced hub motors may include extrusion and/or cryogenic fitting methods relating to the central mandrel and shaft.

18 Claims, 7 Drawing Sheets

(56) References Cited

U.S. PATENT DOCUMENTS

| | | | |
|---|---|---|---|
| 5,487,441 A | 1/1996 | Endo et al. | |
| 5,513,080 A | 4/1996 | Magle et al. | |
| 5,691,584 A * | 11/1997 | Toida | H02K 1/185 |
| | | | 180/65.51 |
| 5,794,730 A | 8/1998 | Kamen | |
| 6,034,465 A * | 3/2000 | McKee | F04D 13/0666 |
| | | | 310/156.23 |
| 6,050,357 A | 4/2000 | Staelin et al. | |
| 6,223,104 B1 | 4/2001 | Kamen et al. | |
| 6,288,505 B1 | 9/2001 | Heinzmann et al. | |
| 6,332,103 B1 | 12/2001 | Steenson, Jr. et al. | |
| 6,408,240 B1 | 6/2002 | Morrell et al. | |
| 6,536,788 B1 | 3/2003 | Kuncz et al. | |
| 6,538,411 B1 * | 3/2003 | Field | B62K 3/007 |
| | | | 180/218 |
| 6,553,271 B1 | 4/2003 | Morrell | |
| 6,561,294 B1 | 5/2003 | Kamen et al. | |
| 6,779,621 B2 | 8/2004 | Kamen et al. | |
| 6,789,640 B1 | 9/2004 | Arling et al. | |
| 6,827,163 B2 | 12/2004 | Amsbury et al. | |
| 6,836,036 B2 * | 12/2004 | Dube | H02K 1/148 |
| | | | 180/65.51 |
| 6,874,591 B2 | 4/2005 | Morrell et al. | |
| 6,965,206 B2 | 11/2005 | Kamen et al. | |
| 6,992,452 B1 | 1/2006 | Sachs et al. | |
| 7,023,330 B2 | 4/2006 | Kamen et al. | |
| 7,053,289 B2 | 5/2006 | Iwai et al. | |
| 7,090,040 B2 | 8/2006 | Kamen et al. | |
| 7,091,724 B2 | 8/2006 | Heinzmann et al. | |
| 7,130,702 B2 | 10/2006 | Morrell | |
| 7,138,774 B2 | 11/2006 | Negoro et al. | |
| 7,157,875 B2 | 1/2007 | Kamen et al. | |
| 7,172,044 B2 * | 2/2007 | Bouvet | A63C 17/12 |
| | | | 180/15 |
| 7,198,280 B2 | 4/2007 | Hara | |
| 7,263,453 B1 | 8/2007 | Gansler et al. | |
| D551,592 S | 9/2007 | Chang et al. | |
| D567,318 S | 4/2008 | Farrelly et al. | |
| 7,424,927 B2 | 9/2008 | Hiramatsu | |
| 7,467,681 B2 | 12/2008 | Hiramatsu | |
| 7,479,097 B2 | 1/2009 | Rosborough et al. | |
| 7,579,738 B2 * | 8/2009 | Cros | B60L 11/1803 |
| | | | 310/216.004 |
| 7,583,001 B2 * | 9/2009 | Lu | H02K 1/148 |
| | | | 310/156.12 |
| 7,740,099 B2 | 6/2010 | Field et al. | |
| 7,757,794 B2 | 7/2010 | Heinzmann et al. | |
| D624,136 S | 9/2010 | Chen | |
| 7,789,174 B2 | 9/2010 | Kamen et al. | |
| 7,811,217 B2 * | 10/2010 | Odien | A63B 21/0058 |
| | | | 482/147 |
| 7,857,088 B2 | 12/2010 | Field et al. | |
| 7,900,725 B2 | 3/2011 | Heinzmann et al. | |
| 7,962,256 B2 | 6/2011 | Stevens et al. | |
| 7,963,352 B2 | 6/2011 | Alexander | |
| 7,979,179 B2 | 7/2011 | Gansler | |
| 8,052,293 B2 | 11/2011 | Hurwitz | |
| 8,083,313 B2 | 12/2011 | Karppinen et al. | |
| 8,146,696 B2 | 4/2012 | Kaufman | |
| 8,170,780 B2 | 5/2012 | Field et al. | |
| 8,308,171 B2 | 11/2012 | Farrelly | |
| 8,467,941 B2 | 6/2013 | Field et al. | |
| 8,490,723 B2 | 7/2013 | Heinzmann et al. | |
| 8,562,386 B2 | 10/2013 | Carlson et al. | |
| 8,682,487 B2 | 3/2014 | Kurth et al. | |
| D704,786 S | 5/2014 | Tang | |
| 9,101,817 B2 * | 8/2015 | Doerksen | A63C 17/12 |
| 9,211,470 B2 * | 12/2015 | Bigler | A63C 17/12 |
| D746,928 S * | 1/2016 | Doerksen | B60K 7/0007 |
| | | | D21/765 |
| 9,233,603 B2 * | 1/2016 | Heinen | B60K 7/0007 |
| 9,400,505 B2 | 7/2016 | Doerksen | |
| 2002/0096380 A1 * | 7/2002 | Lai | B62K 3/002 |
| | | | 180/181 |
| 2004/0212259 A1 * | 10/2004 | Gould | H02K 7/14 |
| | | | 310/67 R |
| 2005/0046304 A1 * | 3/2005 | Tamaki | H02K 21/046 |
| | | | 310/254.1 |
| 2005/0139406 A1 * | 6/2005 | McLeese | A63C 17/01 |
| | | | 180/180 |
| 2005/0241864 A1 | 11/2005 | Hiramatsu | |
| 2006/0012141 A1 | 1/2006 | Bouvet | |
| 2006/0049595 A1 * | 3/2006 | Crigler | A63C 17/01 |
| | | | 280/87.042 |
| 2007/0194558 A1 | 8/2007 | Stone et al. | |
| 2007/0254789 A1 * | 11/2007 | Odien | A63B 21/0058 |
| | | | 482/146 |
| 2010/0330876 A1 | 12/2010 | Carlson et al. | |
| 2011/0295454 A1 * | 12/2011 | Meyers | B62J 17/00 |
| | | | 701/22 |
| 2011/0309772 A1 | 12/2011 | Forgey | |
| 2012/0232734 A1 | 9/2012 | Pelletier | |
| 2013/0081891 A1 | 4/2013 | Ulmen et al. | |
| 2013/0175943 A1 | 7/2013 | Tackett | |
| 2014/0262574 A1 * | 9/2014 | Rodgers | A63C 17/12 |
| | | | 180/167 |
| 2014/0326525 A1 * | 11/2014 | Doerksen | A63C 17/12 |
| | | | 180/181 |
| 2015/0107922 A1 * | 4/2015 | Bigler | A63C 17/12 |
| | | | 180/181 |
| 2016/0059108 A1 * | 3/2016 | Demolder | A63C 17/12 |
| | | | 701/22 |
| 2016/0067588 A1 * | 3/2016 | Tan | A63C 17/12 |
| | | | 180/181 |
| 2016/0121198 A1 * | 5/2016 | Doerksen | A63C 17/01 |
| | | | 701/22 |
| 2016/0136508 A1 * | 5/2016 | Bigler | A63C 17/014 |
| | | | 180/181 |

OTHER PUBLICATIONS

Sep. 11, 2014, Written Opinion of the International Searching Authority from the U.S. Receiving Office, in PCT Patent Application PCT/US2014/036244, which is an international application of Applicant Future Motion, Inc.

Nov. 19, 2015, International Preliminary Report on Patentability from The International Bureau of WIPO in PCT Patent Application PCT/US2014/036244, which is an international application of Applicant Future Motion, Inc.

Jan. 27, 2016, International Search Report of the International Searching Authority from the U.S. Receiving Office, in PCT Patent Application PCT/US2015/059332, which is an international application of Applicant Future Motion, Inc.

Jan. 27, 2016, Written Opinion of the International Searching Authority from the U.S. Receiving Office, in PCT Patent Application PCT/US2015/059332, which is an international application of Applicant Future Motion, Inc.

Ben Smither, Balancing Scooter / Skateboard:, video, retrieved Sep. 22, 2016 from https://www.youtube.com/watch?v=HGbbag9dkIU, uploaded to YouTube on Mar. 4, 2007.

www.electricunicycle.com, "Leviskate self-balancing one-wheel skateboard", video, retrieved Sep. 22, 2016 from https://www.youtube.com/watch?v=462Jj1xSSqc, uploaded to YouTube on Aug. 5, 2007.

John Xenon, "One wheel self balancing skateboard Ver2 Jan. 2009. #2", video, retrieved Sep. 22, 2016 from https://www.youtube.com/watch?v=8RPFNUsuW78, uploaded to YouTube on Jan. 3, 2009.

Rodger Cleye, "Leviskate (Balancing Skateboard) in Operation", video, retrieved Sep. 22, 2016 from https://www.youtube.com/watch?v=eN2J8m_E0go, uploaded to YouTube on Apr. 18, 2013.

Sep. 21, 2016, Office action from the U.S. Patent and Trademark Office, in U.S. Appl. No. 15/184,906, which is another application of Applicant Future Motion, Inc.

* cited by examiner

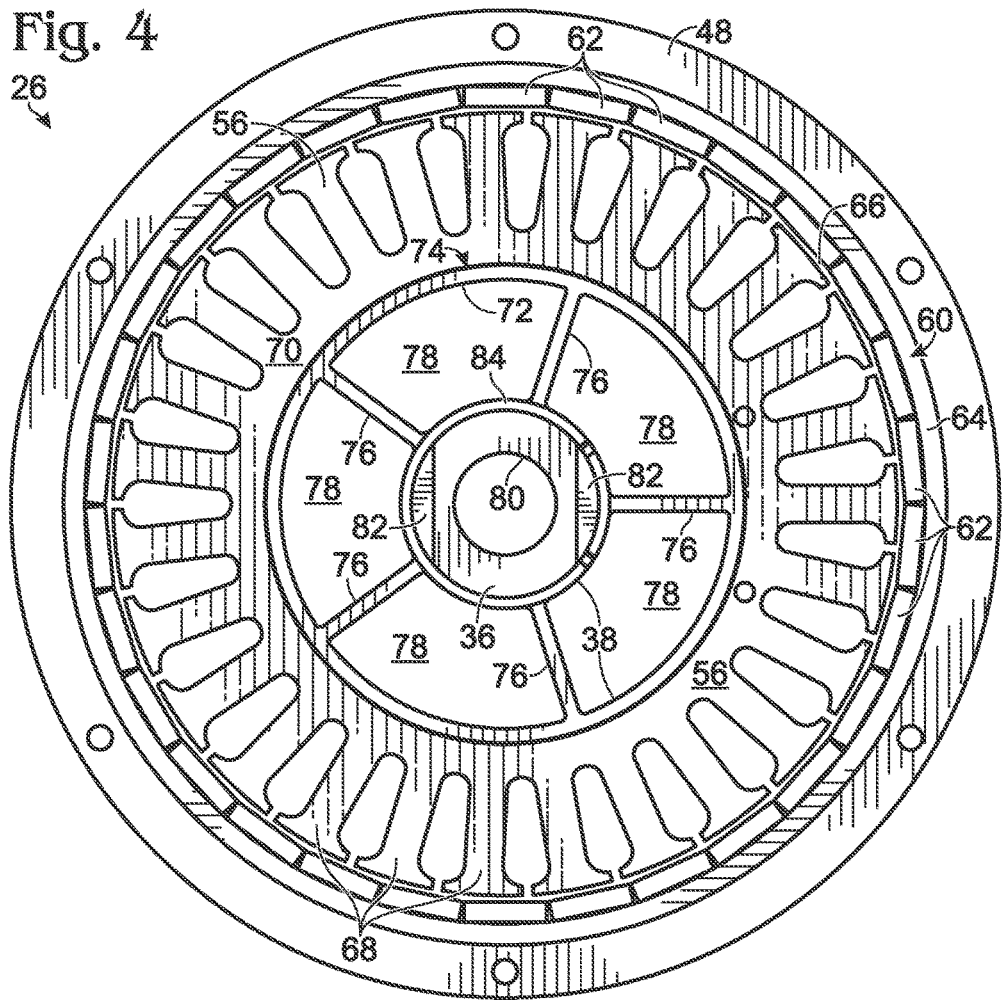
Fig. 4
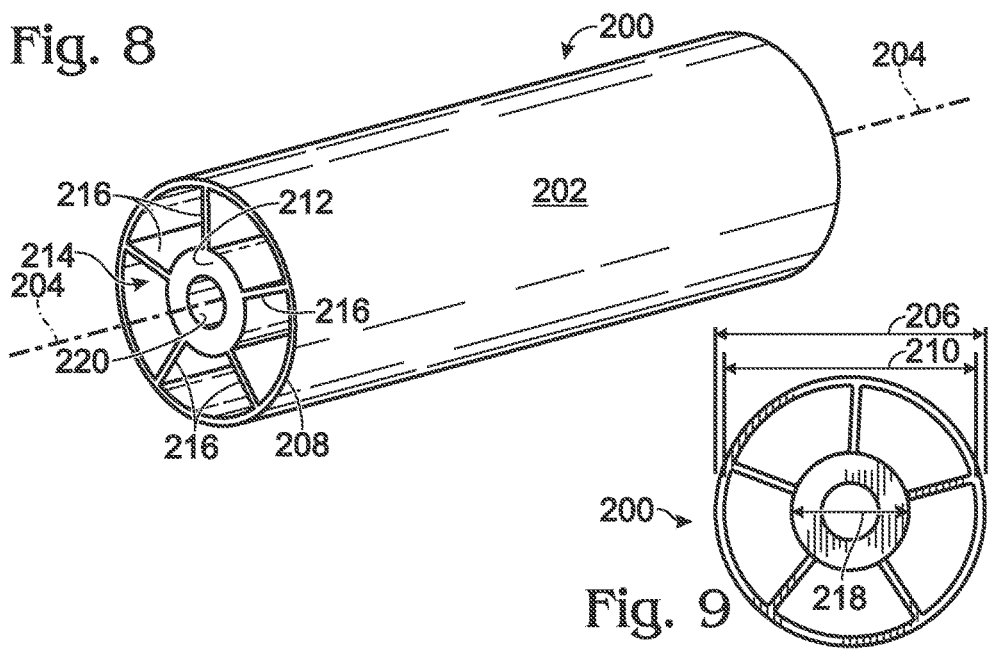
Fig. 8
Fig. 9

US 9,598,141 B1

THERMALLY ENHANCED HUB MOTOR

CROSS-REFERENCES

The following related applications and materials are incorporated herein, in their entireties, for all purposes: U.S. Pat. No. 9,101,817 and U.S. patent application Ser. No. 14/934,024.

FIELD

This disclosure relates to systems and methods for enhancing the thermal characteristics of hub motors suitable for use in self-stabilizing electric vehicles.

INTRODUCTION

Electric motors are ubiquitous, found in everything from household appliances and toys to high-performance automobiles. These motors come in various forms and categories. Magnetic hub motors include a central stationary stator to which a driving electrical current is applied, and an outer rotor that spins around the stator. These motors are useful for driving fans, wheels of vehicles, and the like. However, partly because the stator is typically enclosed, these motors have a likelihood to experience heat build-up. This heat build-up in the stator means that the full capacity of the motor cannot be utilized. For example, known hub motors that are capable of multiple kilowatts may have a power output limited to approximately 500 to 1000 Watts. Vehicles and other devices utilizing these motors are therefore limited as well.

SUMMARY

Apparatuses and methods relating to thermally enhanced hub motors disclosed herein overcome the problems described above through improved axle geometries, materials, and/or manufacturing processes. Benefits may include extending the performance envelope for a motor, reducing motor weight, reducing operating temperatures, increasing power output, and/or extending motor lifetime. Corresponding benefits are applicable to a vehicle or other device driven by these motors.

Accordingly, the present disclosure provides systems, apparatuses, and methods relating to thermally enhanced hub motors. In some embodiments, an electric vehicle may comprise a board including a frame supporting first and second deck portions, each deck portion configured to receive a left or right foot of a rider oriented generally perpendicular to a direction of travel of the board; a wheel assembly including a rotatable ground-contacting element disposed between and extending above the first and second deck portions; a hub motor configured to rotate the ground-contacting element to propel the electric vehicle, the hub motor including a rotor; a stator disposed within the rotor; a motor casing housing the rotor and the stator; and an axle extending from the stator through the motor casing, the axle being coupled to the frame of the board; wherein the axle comprises aluminum.

In some embodiments, an electric vehicle may comprise a board including a frame supporting first and second deck portions, each deck portion configured to receive a left or right foot of a rider oriented generally perpendicular to a direction of travel of the board; a wheel assembly including a rotatable ground-contacting element disposed between and extending above the first and second deck portions; a hub motor configured to rotate the ground-contacting element to propel the electric vehicle, the hub motor including a rotor, a stator disposed concentrically within the rotor, such that the rotor is configured to rotate about the stator, and an axle portion coupled to the frame of the board, the axle portion having a central shaft extending axially from a mandrel fixed concentrically within the stator, an outer surface of the mandrel in direct contact with the stator; wherein the central shaft and the mandrel together form a unit consisting of a single material having a thermal conductivity substantially higher than the stator.

In some embodiments, an electric vehicle may comprise a board including a frame supporting first and second deck portions, each deck portion configured to receive a left or right foot of a rider oriented generally perpendicular to a direction of travel of the board; a wheel assembly including a rotatable ground-contacting element disposed between and extending above the first and second deck portions; a hub motor configured to rotate the ground-contacting element to propel the electric vehicle, the hub motor including a stator disposed concentrically within the ground-contacting element, and an axle portion having a central shaft extending axially from a mandrel fixed concentrically within the stator, an outer surface of the mandrel in direct contact with the stator, the central shaft and the mandrel comprising aluminum; wherein the axle portion of the hub motor is in thermal communication with the frame of the board.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 4 is an end view of the hub motor of FIG. 3.

FIG. 8 is an isometric view of an extruded elongate member produced by an intermediate step in an illustrative manufacturing process.

FIG. 9 is an end elevation view of the elongate member of FIG. 8.

DESCRIPTION

Figure 1:
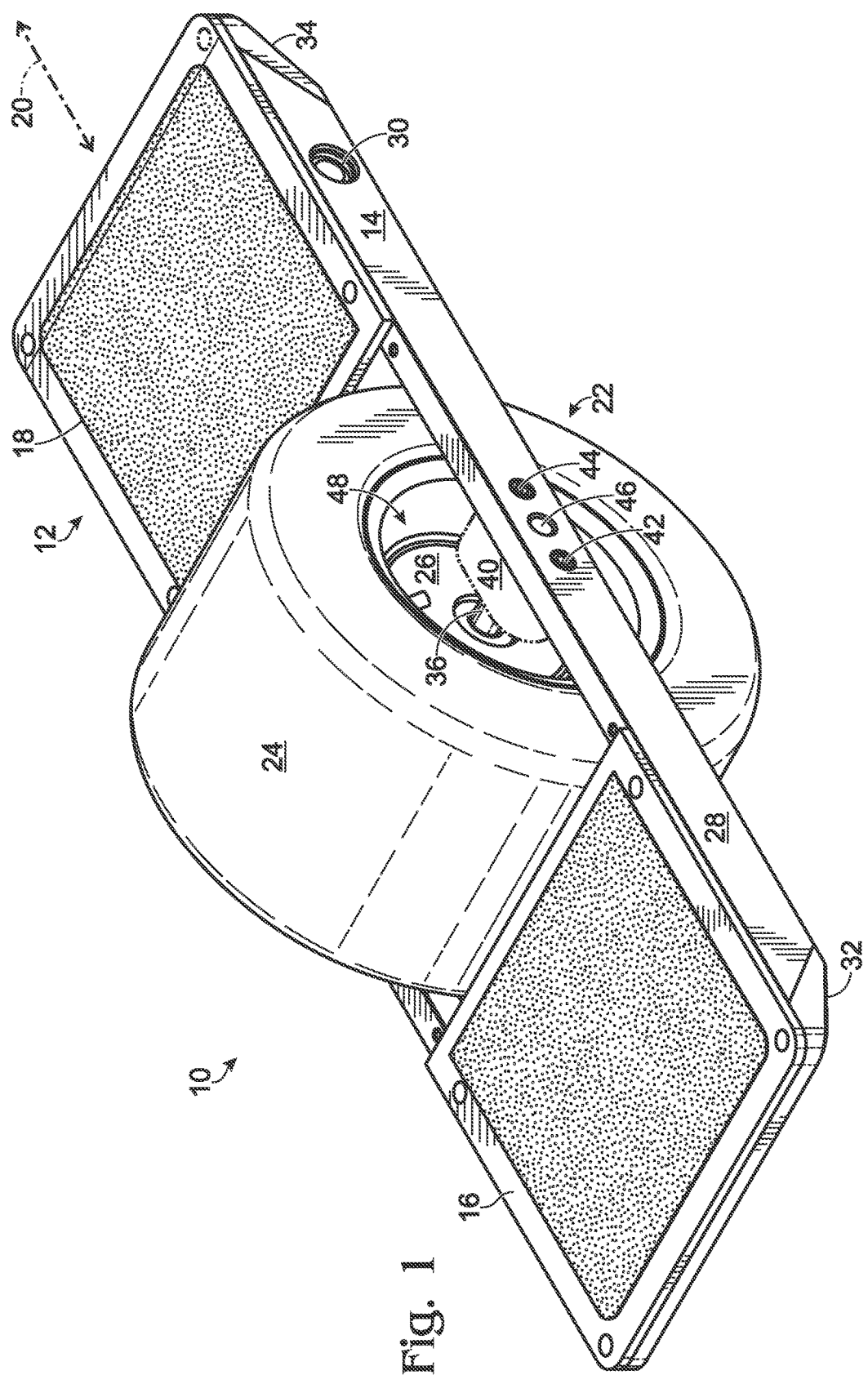
FIG. 1 is an isometric view of an illustrative electric vehicle having a thermally enhanced hub motor.

Various aspects and examples of an electric hub motor having a high-thermal conductivity central axle and a vehicle utilizing such a hub motor, as well as related methods, are described below and illustrated in the associated drawings. Unless otherwise specified, a vehicle including a thermally enhanced hub motor and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

DEFINITIONS

"Thermal conductivity" of a material refers to a property quantifying the ability of the material to conduct heat. Thermal conductivity may be abbreviated herein as k, and is typically measured in units of Watts per meter per Kelvin (W/(mK)). Heat transfer occurs at lower rates through materials with lower k, and at higher rates through materials with higher k. In metals, thermal conductivity may vary with temperature. Accordingly, comparisons between different materials should be understood to be in the context of substantially the same temperature or range of temperatures.

Overview

In general, a thermally enhanced hub motor may include a high-k central axle, relative to a k of the motor's stator, where a mandrel of the axle is interference fit into the stator. The mandrel and shaft of the axle have a thermal conductivity substantially higher than the stator, such that heat will be transferred from the stator, through the mandrel and shaft. This heat can then be transferred to a heat sink outside the motor.

The stator body of a hub motor typically includes a plurality of steel laminations. A central axle, according to the present teachings, may be constructed from an aluminum or magnesium alloy, thus having a substantially higher thermal conductivity than the lamination stack. The external heat sink may comprise an aluminum alloy or other suitable material, and may include a portion (e.g., a frame) of an apparatus to which the motor is mounted. Accordingly, heat from the stator will flow readily from the stator through the mandrel and shaft of the central axle, to the heat sink, thereby cooling the stator and facilitating improved motor performance characteristics.

For example, a vehicle or other apparatus having a thermally enhanced hub motor may include a frame to which the motor is directly or indirectly coupled. As is typical in a hub motor, the electric motor includes a rotor and a stator disposed concentrically within the rotor, such that the rotor is configured to rotate about the stator. In some examples, a tire or other ground-contacting element is coupled to the rotor, allowing the motor to propel the vehicle across a support surface.

The hub motor may include an axle portion that is coupled to the frame of the vehicle. A central shaft of the axle portion may extend axially from a larger mandrel fixed concentrically within the stator. The outer surface of the mandrel may be in direct contact with the stator, to facilitate heat transfer between the two. The central shaft and the mandrel may be unitary. In other words, the shaft and mandrel may form a unit made out of a single material. The mandrels described below are generally cylindrical. However, the outer shape of the mandrel may have other shapes (e.g., octagonal or hexagonal prisms), have keyed (e.g., castellated) surfaces, and/or the like, or any combination of these. A convoluted or shaped mandrel surface may be helpful for alignment, or for increasing the contact surface area between the mandrel and a corresponding inner surface of the stator, thereby altering heat transfer and/or torque transfer characteristics.

Examples, Components, and Alternatives

The following sections describe selected aspects of exemplary thermally enhanced hub motors as well as related apparatuses, systems, and methods. The examples in these sections are intended for illustration and should not be interpreted as limiting the entire scope of the present disclosure. Each section may include one or more distinct inventions, and/or contextual or related information, function, and/or structure.

Illustrative Vehicle Having a Thermally Enhanced Hub Motor

As shown in FIGS. 1-5, this section describes an illustrative vehicle 10 having a thermally enhanced hub motor.

Vehicle 10 is a one-wheeled, self-stabilizing skateboard substantially similar to the electric vehicles described in U.S. Pat. No. 9,101,817 (the '817 patent), the entirety of which is hereby incorporated herein for all purposes. Accordingly, vehicle 10 includes a board 12 having a frame 14 supporting a first deck portion 16 and a second deck portion 18. Each deck portion 16, 18 is configured to receive a left or right foot of a rider oriented generally perpendicular to a direction of travel of the board, said direction of travel generally indicated at 20.

Vehicle 10 also includes a wheel assembly 22. Wheel assembly 22 includes a rotatable ground-contacting element 24 (e.g., a tire, wheel, or continuous track) disposed between and extending above the first and second deck portions 16, 18, and a hub motor 26 configured to rotate ground-contacting element 24 to propel the vehicle. As shown in FIG. 1, vehicle 10 may include exactly one ground-contacting element.

Frame 14 may include any suitable structure configured to rigidly support the deck portions and to be coupled to an axle of the wheel assembly, such that the weight of a rider may be supported on tiltable board 12 having a fulcrum at the wheel assembly axle. Frame 14 may include one or more frame members 28, on which deck portions 16 and 18 may be mounted, and which may further support additional elements and features of the vehicle, such as a charging port 30, and end bumpers 32, 34, as well as lighting assemblies, battery and electrical systems, electronics, controllers, and the like (not shown).

Deck portions 16 and 18 may include any suitable structures configured to support the feet of a rider, such as non-skid surfaces, as well as vehicle-control features, such as a rider detection system, and the like. Illustrative deck portions, including suitable rider detection systems, are described in the '817 patent, as well as in U.S. patent application Ser. No. 14/934,024, the entirety of which is hereby included herein for all purposes.

A shaft 36 of an axle portion 38 of hub motor 26 is coupled to frame 14, as shown in FIG. 1. Shaft 36 is coupled to frame 14 such that the axle portion of the hub motor is in thermal communication with the frame of the board. For example, the shaft may be directly attached to frame 14 (see description of FIGS. 6-7 below), or may be coupled to the frame through a connection or mounting block 40 (also referred to as an axle mount). Shaft 36 may be bolted or otherwise affixed to mounting block 40, which in turn may be bolted or affixed to frame 14 (e.g., by bolts 42, 44). A through hole 46 may be provided in frame 14 for access to the connector of shaft 36 to block 40. Coupling of shaft 36 to frame 14 facilitates use of frame 14 as a heat sink.

Figure 2:
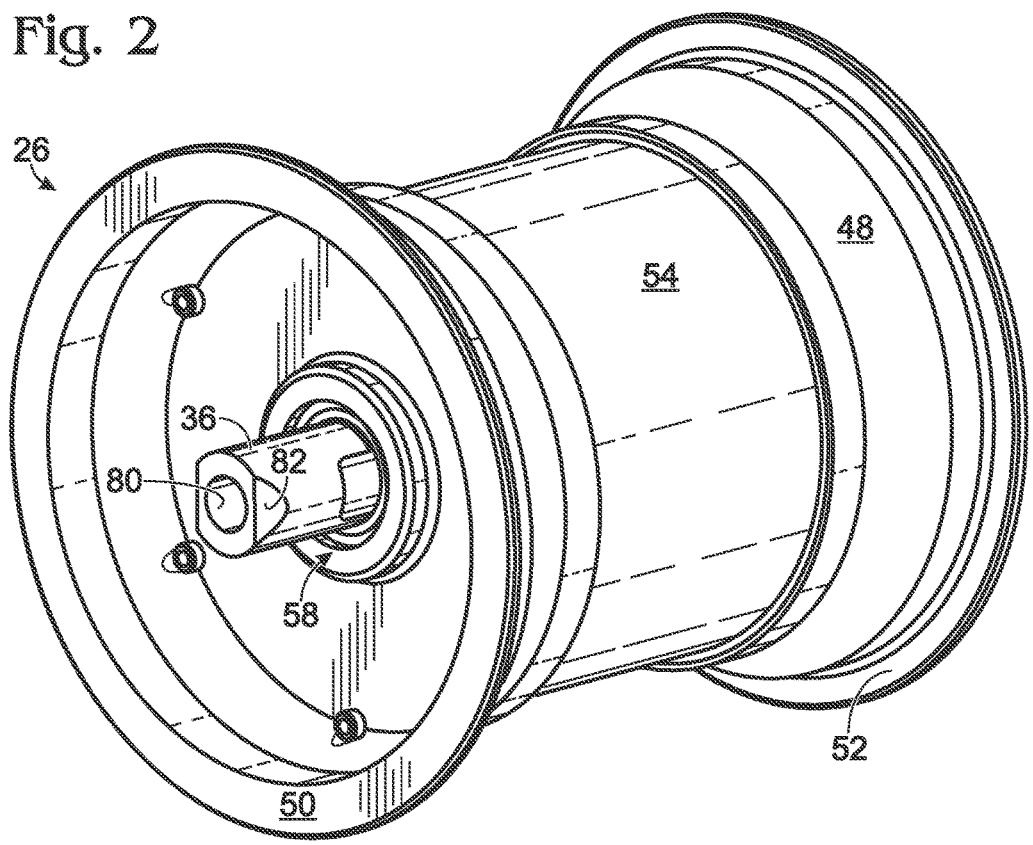
FIG. 2 is an isometric view of an illustrative hub motor suitable for use in the electric vehicle of FIG. 1, among other applications.
Figure 3:
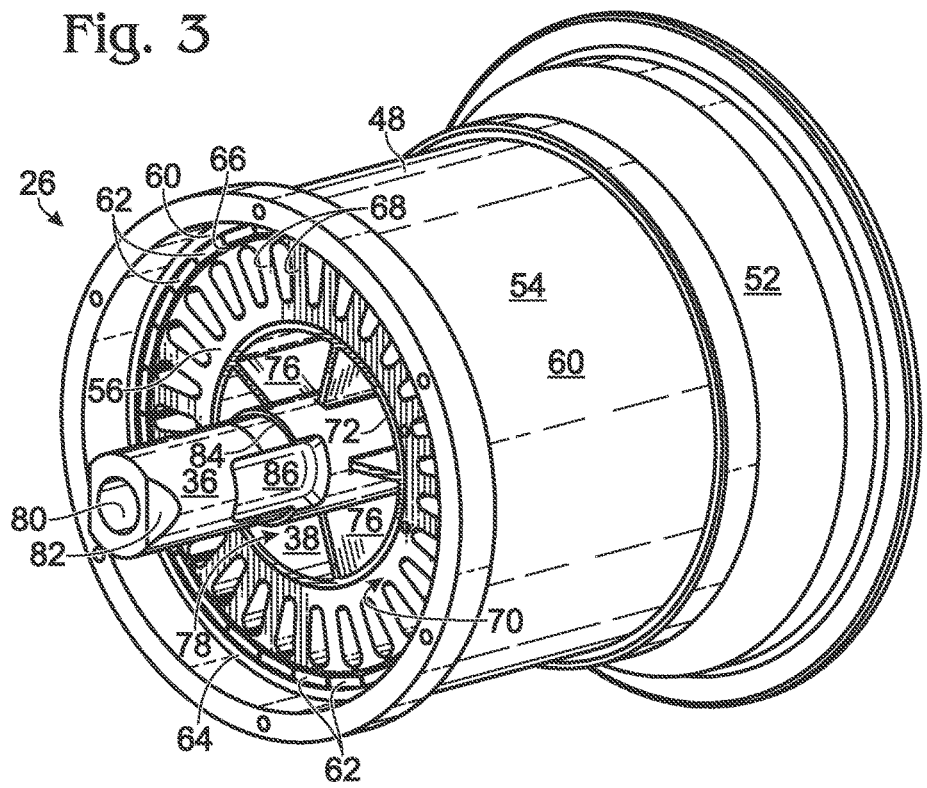
FIG. 3 depicts the hub motor of FIG. 2 with an end bell portion and motor windings removed to show various motor components.

Turning to FIGS. 2-4, hub motor 26 is shown isolated from the remainder of vehicle 10. Hub motor 26 is suitable for use in any number of vehicles or other apparatuses, and is not limited to the present contextual example. Hub motor 26 is a brushless, direct-drive electric motor, and may be operated using any suitable electrical controls and wiring. For example, when used in vehicle 10, phase wires (not shown) may electrically connect one or more electric coils of the motor with one or more other electrical components of vehicle 10, such as a power stage, motor controller, battery, and the like (not shown). The one or more electrical components may drive hub motor 26 based on rider inputs to propel and actively balance vehicle 10. For example, the one or more electrical components may be configured to sense tilting of board 12 about a pitch axis, and to drive hub motor 26 to rotate element 24 in a similar direction about the pitch axis.

Hub motor 26 has an outer motor casing 48 including a pair of end bells 50 and 52 bolted to a central cylinder portion 54. Shaft 36 extends from a stator 56 of motor 26, through casing 48, and the casing is supported on the shaft by one or more bearings 58. In addition to forming an outer shell for motor 26 and a mounting surface for ground-contacting element 24, cylinder portion 54 of casing 48 is an outer wall of a rotor 60 of hub motor 26. Accordingly, cylinder portion 54 and casing 48 as a whole are configured to rotate about stator 56 when the motor is operated.

Rotor 60 is a generally cylindrical structure having a plurality of magnets 62 fixedly arranged around an inner wall 64. Magnets 62 may be permanent magnets, and may be generally rectangular, with long axes of the magnets extending along a length of the rotor. Rotor 60 may be configured to rotate around stator 56, leaving an air gap 66 between the two structures.

Stator 56 is a generally cylindrical structure having a plurality of projections 68 (also referred to as teeth) forming slots therebetween. Projections 68 are configured to hold electrical windings or coils (not shown). Energizing the coils sets up a rotating magnetic field, which exerts a force on magnets 62, thereby spinning the rotor. Stator 56 includes metal (usually steel) sheets or laminations 70 layered together, an outermost of which can be seen in FIG. 4. These laminations typically comprise so-called electrical steel or silicon steel, and are collectively referred to as a lamination stack. Electrical steel and the lamination topology function to produce a magnetically permeable structure, while reducing core losses by interrupting induced eddy currents. However, the steel structure has a low thermal conductivity, and tends to retain heat, especially when enclosed in motor casing 48.

Figure 5:
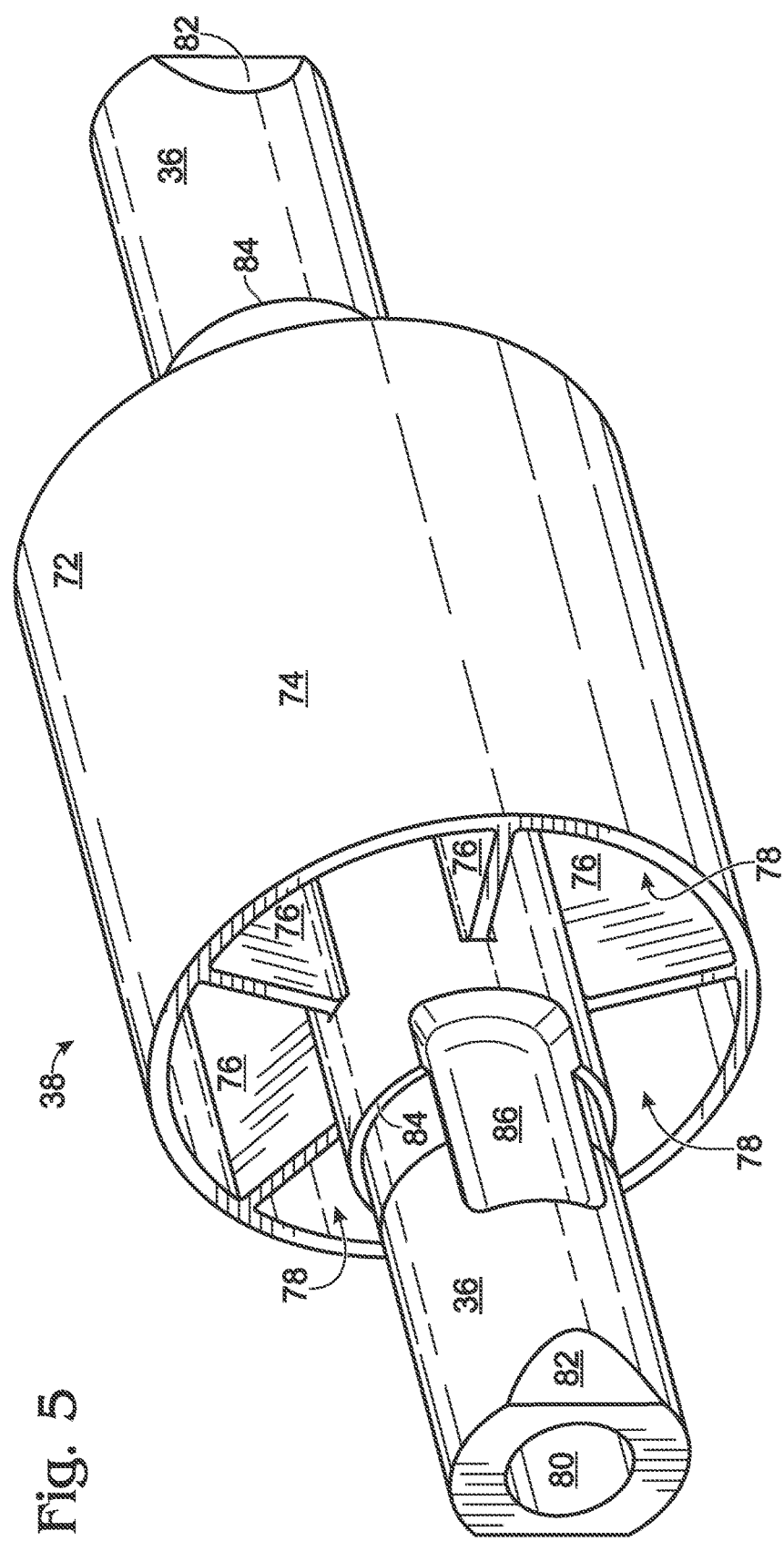
FIG. 5 is an illustrative axle portion suitable for use in a hub motor, such as the hub motor shown in FIGS. 2-4.

Axle portion 38 is disposed concentrically within stator 56 in an interference fit. Axle portion 38 includes a mandrel portion 72 and shaft 36, an outer surface 74 of mandrel portion 72 being in direct contact with the stator. With continuing reference to FIGS. 2-4, FIG. 5 is an isometric view of the mandrel and shaft of axle portion 38 isolated from remaining components of hub motor 26. Mandrel portion 72 may have a larger diameter than the shaft of the axle portion, as shown in FIGS. 3-5. Shaft 36 is a central shaft extending axially from mandrel portion 72, which is fixed concentrically within the stator. The central shaft and the mandrel together form a unit, which may consist of a single material having a thermal conductivity substantially higher than the stator. In some examples, this unit is made of aluminum, or of a single alloy of aluminum. In some examples, this unit is made of magnesium, or of a single alloy of magnesium.

Aluminum, for example, has a significantly higher thermal conductivity than does the steel of stator 56, with aluminum being on the order of 205 W/(mK), while steel is typically less than 100. Similarly, magnesium has a thermal conductivity on the order of 156 W/(mK). In some examples, the thermal conductivity of the stator is less than approximately 100 W/(mK), and the thermal conductivity of the unit formed by the central shaft and the mandrel is greater than approximately 125 W/(mK) (e.g., greater than approximately 150 W/(mK)).

Mandrel portion 72 has two opposing end portions 76, 78, and central shaft 36 extends axially from both of the end portions of the mandrel. In some examples, shaft 36 may extend from only one of the end portions, such as when a hub motor is side-mounted to a supporting structure, leaving one side free.

Mandrel portion 72 is connected to shaft 36 by a plurality of radial connectors 76, (also referred to as connection members) which run the length of mandrel portion 72 and form a plurality of lengthwise cavities 78 therebetween. Radial connectors 76 may be unitary with the mandrel portion and the central shaft, and may be made of the same material (e.g., aluminum alloy). Although axle portion 38 is shown in the drawings as having five such radial connectors 76, more or fewer may be used. In some examples, mandrel portion 72 may be radially continuous with shaft 36, forming a solid structure without any cavities 78.

Shaft 36 may include one or more end apertures 80, which may be threaded, end chamfers 82, one or more stepped abutments 84, and/or a lateral recess 86. End apertures 80 and/or chamfers 82 may be utilized for facilitating the attachment of shaft 36 to a mounting structure, such as mounting block 40 or frame 14 (see additional discussion below regarding FIGS. 6-7). Abutments 84 may include a slight step change in the diameter of shaft 36, and may be utilized for proper positioning and interfacing with one or more bearings, such as bearings 58. Finally, lateral recess 86 may function as a mounting surface for one or more electronic components and/or a through-way for electrical wiring (when installed in hub motor 26).

Illustrative Frame Mount

Figure 6:
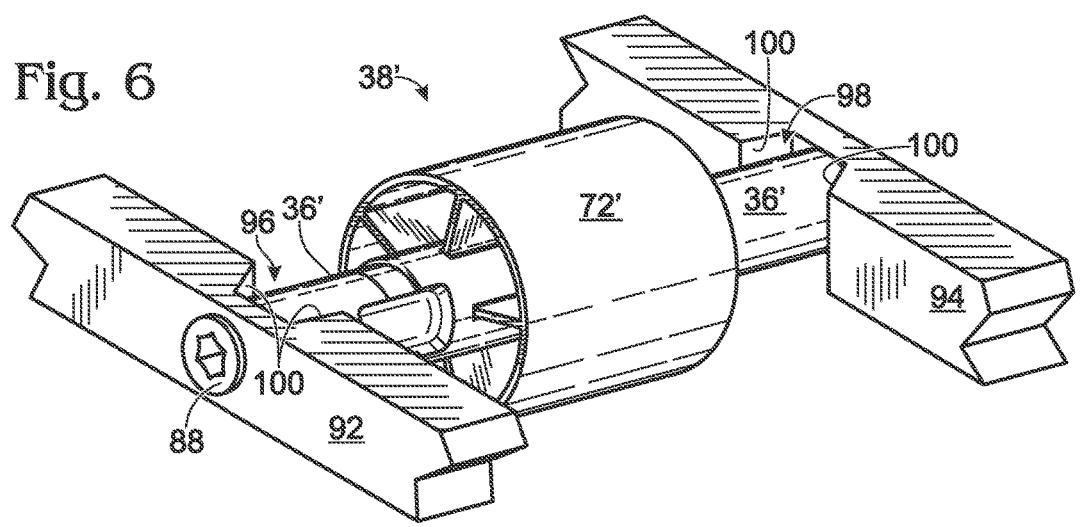
FIG. 6 is an isometric view of the axle portion of FIG. 4 coupled to a pair of illustrative frame members.
Figure 7:
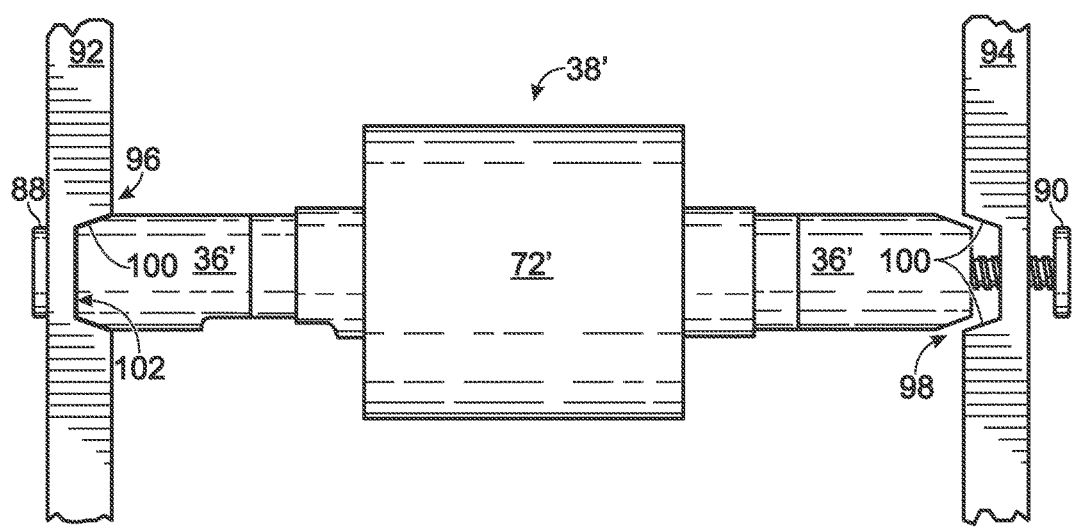
FIG. 7 is a plan view of the axle portion and frame members of FIG. 5.

As shown in FIGS. 6-7, this section describes an alternative coupling between hub motor 26 and a frame or other mounting surface. An axle portion of a hub motor is shown in FIGS. 6 and 7, which is substantially identical to axle portion 38, described above. Accordingly, the axle portion of FIGS. 6 and 7 will be referred to as axle portion 38', with primed reference numbers for its component elements corresponding to those of axle portion 38. Features and component elements of axle portion 38' not described directly below are understood to be substantially as described above.

Axle portion 38' may include end bolts 88, 90, for coupling shaft 36' of the hub motor directly to a frame or other mounting support structure. In the example shown in FIGS. 6 and 7, axle portion 38' is attached to a pair of frame members 92 and 94. Frame members 92 and 94 may include any suitable support structures forming a part of (or attached to) a larger apparatus, thereby providing a heat sink for heat being conducted through axle portion 38'. Frame members 92 and 94 may comprise a same material as axle portion 38', such as an aluminum or magnesium alloy, to further enhance heat transfer.

As depicted in FIGS. 6 and 7, frame members 92 and 94 each have an opening 96, 98, having angled walls 100 configured to receive a respective chamfered end of shaft 36'. Bolts 88 and 90 are used to draw their respective ends into the openings. In this example, the depths of openings 96 and 98 are such that chamfers 82' will abut against angled walls 100 before the end of the shaft bottoms out against the frame member. In other words, a gap 102 exists between the end of the shaft and the inner wall of the frame member. Accordingly, tightening of the end bolts causes the shafts to more firmly wedge into the openings. Chamfers 82' and angled walls 100 are configured such that the axle portion and stator of the hub motor are properly oriented and maintained in a proper orientation with respect to the remainder of the apparatus when shaft 36' is fixed to frame members 92 and 94.

Illustrative Intermediate Article of Manufacture

As shown in FIGS. 8-9, this section describes an intermediate article of manufacture suitable for use in the manufacturing of a mandrel and axle shaft for a thermally enhanced hub motor.

FIG. 8 is an isometric view of an elongate cylinder 200 having an outer surface 202, a long axis 204, and an outer diameter 206. FIG. 9 is an end elevation view of cylinder 200, showing various dimensions thereof. As described below, cylinder 200 may be extruded as a single piece in the form shown in FIG. 8, and may comprise aluminum or magnesium. In some examples, cylinder 200 is made of an aluminum alloy or a magnesium alloy.

Cylinder 200 includes an outer tube 208, which has an inner diameter 210, surrounding and connected to an inner shaft 212. At least one lengthwise cavity or gap 214 is formed between the outer tube and the inner shaft. Outer tube 208 is connected to inner shaft 212 by a plurality of radial members 216 (also referred to as radial connectors or spokes). Inner shaft 212 has an outer diameter 218, which is smaller than outer diameter 206 and inner diameter 210. Inner shaft 212 is hollow, having a lengthwise axial aperture 220.

Referring back to axle portion 38 of FIG. 5, it may be understood that cylinder 200 has the same structural form as mandrel portion 72. Similarly, it may be understood that the extruded form of cylinder 200 may be machined to remove a portion of outer tube 208 and radial members 216 to produce shaft 36. Accordingly, extruded cylinder 200 may be an intermediate article in the manufacturing of axle portion 38, or the like.

Thermal Simulation Results

Figure 10:
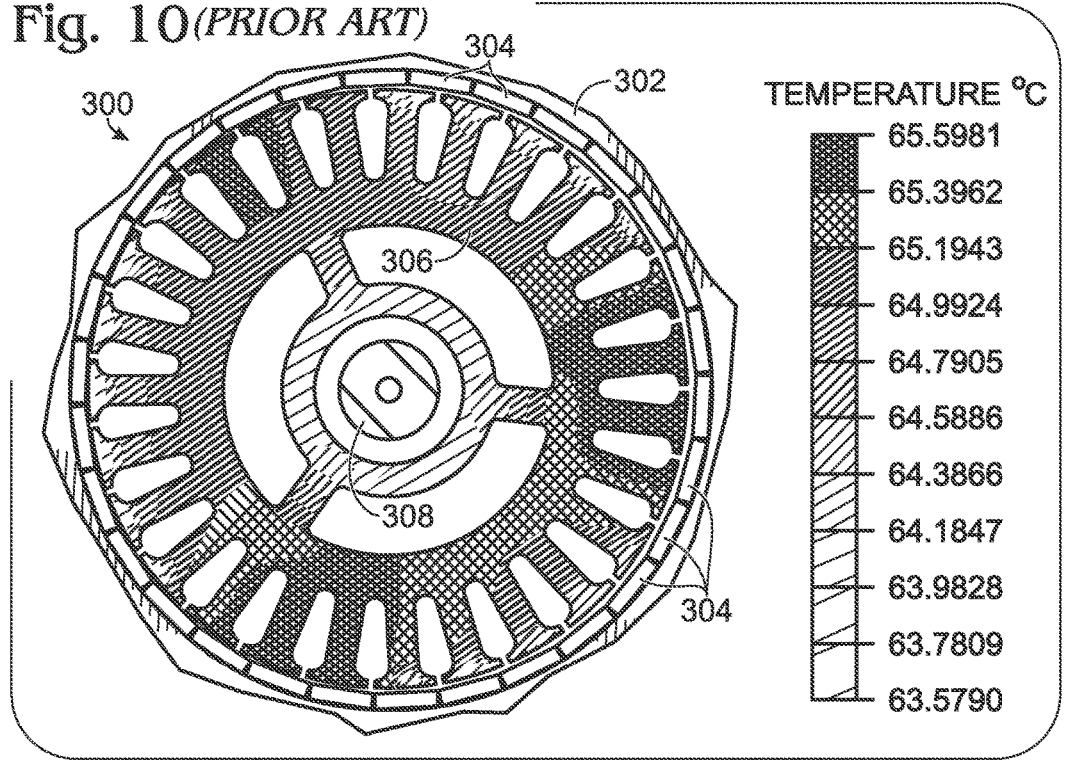
FIG. 10 shows illustrative results of a thermal simulation of heat in a known hub motor having a steel axle.
Figure 11:
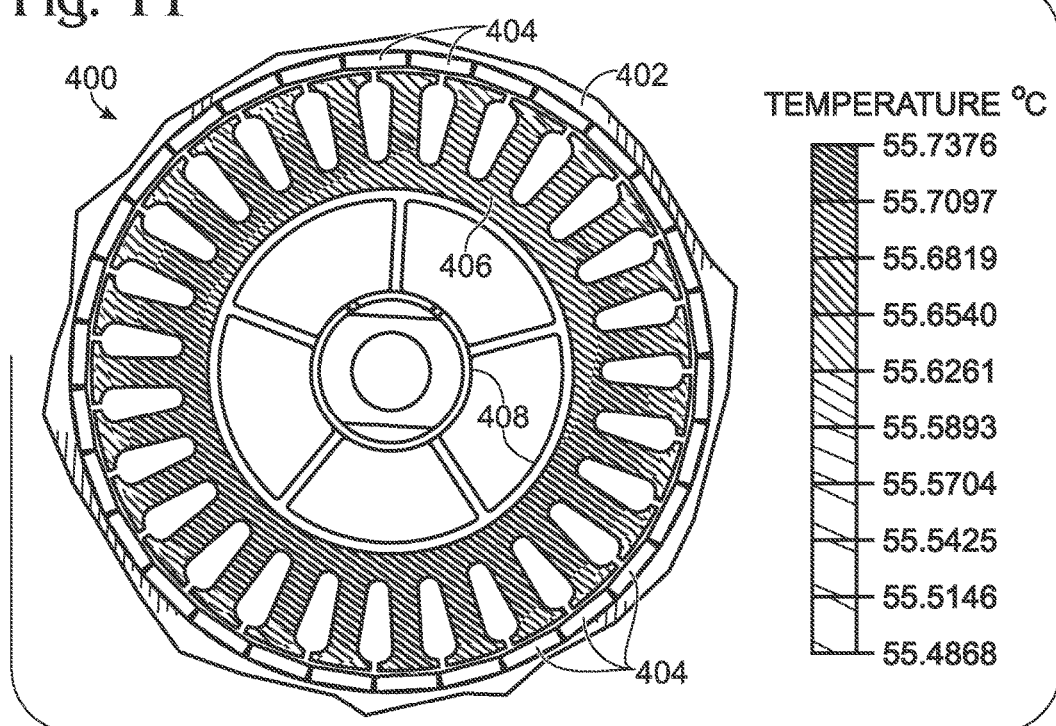
FIG. 11 shows illustrative results of a thermal simulation of heat in an enhanced hub motor in accordance with aspects of the present disclosure.

As shown in FIGS. 10-11, this section describes the results of a simulation of thermal effects in a standard-construction hub motor having a steel axle, as compared with a thermally enhanced hub motor in accordance with the present teachings. Additional features and benefits are also described.

This simulation was performed assuming 500 Watts (W) of total output in each of a prior art motor 300 (see FIG. 10) and a thermally enhanced hub motor 400 (see FIG. 11). Motor 300 includes a rotor 302 having magnets 304, and a steel stator 306 having a central steel axle 308. Motor 400 includes a rotor 402 having magnets 404, and a steel stator 406 having an aluminum alloy axle portion 408 including a mandrel and shaft, substantially as described above.

The 500 W was divided equally among the 27 coils/windings in each motor, such that each projection of the respective stator had an applied 18.5 W. Ambient temperature was assumed to be 25 C, and steady-state equilibrium conditions were simulated.

As shown in FIGS. 10 and 11, and in Table 1 below, significant differences were found between the thermal performances of the two motors. Average stator temperature in standard hub motor 300 was about 64 C, while average stator temperature in thermally enhanced motor 400 was about 55.6 C. Moreover, the range of temperatures in stator 306 was much wider than in stator 406, due to the thinner walls and aluminum construction. As shown in FIGS. 10 and 11, the range of temperatures in the standard motor was approximately 2 C, while enhanced motor 400 varied by less than half of a degree C. Thermally enhanced motor 400 also experienced a reduced average temperature of magnets 404 as compared to magnets 304.

Additional benefits are present in the thermally enhanced hub motor. Hub motor 400 is suitable for use in a vehicle such as vehicle 10, and has a substantially reduced stator, axle, and combined mass, as compared with the standard hub motor that would be used for the same application. See Table 1.

TABLE 1

| | Motor 300: Standard Steel Axle | Motor 400: Aluminum Alloy Mandrel |
|---|---|---|
| Average Stator Temp. (C.) | 64 | 55.6 |
| Average Magnet Temp. (C.) | 48 | 43.1 |
| Stator Mass (g) | 2627 | 1888 |
| Axle Mass (g) | 545 | 296 |
| Total Mass (kg) | 3.17 | 2.18 |

Illustrative Manufacturing Method

Figure 12:
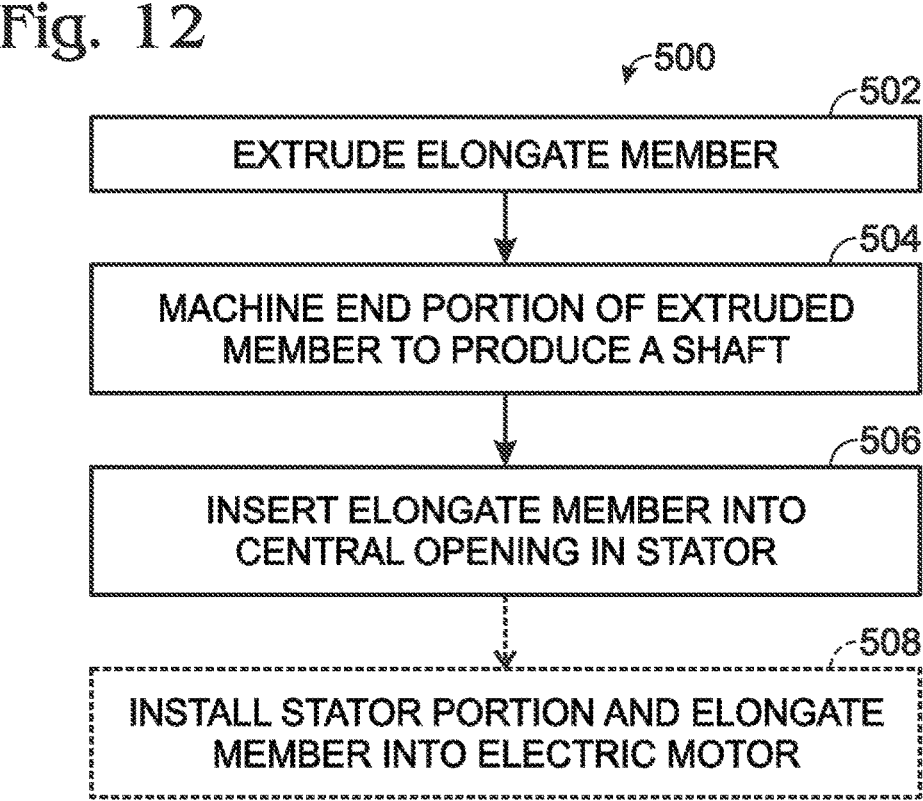
FIG. 12 is a flow chart depicting steps in an illustrative method for manufacturing an electric hub motor.

This section describes steps of an illustrative method for manufacturing a hub motor; see FIG. 12. Aspects of vehicles, hub motors, and/or intermediate articles of manufacture described above may be utilized in the method steps described below. Where appropriate, reference may be made to previously described components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. FIG. 12 depicts multiple steps of a method, generally indicated at 500, which may be performed in conjunction with thermally enhanced hub motors according to aspects of the present disclosure. Although various steps of method 500 are described below and depicted in FIG. 12, the steps need not necessarily all be performed, and in some cases may be performed in a different order than the order shown.

Step 502 of method 500 includes extruding an elongate member out of relatively high-k material, such as an aluminum alloy or a magnesium alloy. The elongate member may be cylindrical, and may include an outer surface, a long axis, and a first outer diameter. Cylinder 200 of FIG. 8 is an example of an elongate member that may result from step 502. Accordingly, the extruded member may comprise an outer tube surrounding and connected to an inner shaft, such that at least one lengthwise cavity or gap is formed between the outer tube and the inner shaft. The outer tube may be connected to the inner shaft by a plurality of radial members, which may also be referred to as connectors, connector members, fins, or spokes.

Extrusion of the elongate member, as compared, for example, to casting methods, allows otherwise infeasible alloys of aluminum or magnesium to be utilized. These alloys may have higher thermal conductivities. The extrusion process also results in a more uniform grain structure in the metal, which further enhances the heat transfer capacity of the material.

Step 504 of method 500 includes machining a first end portion of the extruded member to produce a shaft extending coaxially from a remaining unmachined portion of the elongate member. The shaft may have a second outer diameter smaller than the first outer diameter. Step 504 may include additional machining, milling, lathing, and/or the like, and may produce an article such as the unitary mandrel and shaft shown in FIG. 5.

Step 506 of method 500 includes inserting the elongate member into a corresponding central opening in a stator portion of an electric motor. The elongate member is inserted such that the elongate member is coupled to the stator portion in a concentric interference fit. When inserted, the shaft extends beyond the stator portion, as shown in the example of FIG. 3.

In some examples, step 506 may include inserting the elongate member (e.g., a mandrel) into the stator by pressing the elongate member into an opening of the stator. In some examples, step 506 may instead include compression shrink fitting, also referred to as cryo-fitting. In the compression shrink fitting examples, the elongate member may be cooled using a cryogen (e.g., liquid nitrogen) before insertion into the opening of the stator. Cooling the elongate member shrinks it slightly, resulting in a reduced outer diameter. Following insertion, a subsequent return of the elongate member to ambient temperature causes the elongate member to expand to its original size. The inner diameter of the stator opening is configured such that outward/lateral expansion of the elongate member results in a tight interference fit between the two components. This method may be preferred over press-fitting, as it results in less galling, scoring, and damage to the mating surfaces of the components, thereby resulting in better heat transfer.

Step 508 of method 500, which is optional, may include installing the joined stator portion and elongate member into an electric motor. Step 508 may include inserting the stator assembly concentrically within an outer rotor of the motor. Step 508 may include encasing the rotor and stator in a motor casing, with the shaft(s) of the elongate member protruding through the motor casing.

Illustrative Heat Reduction Method

Figure 13:
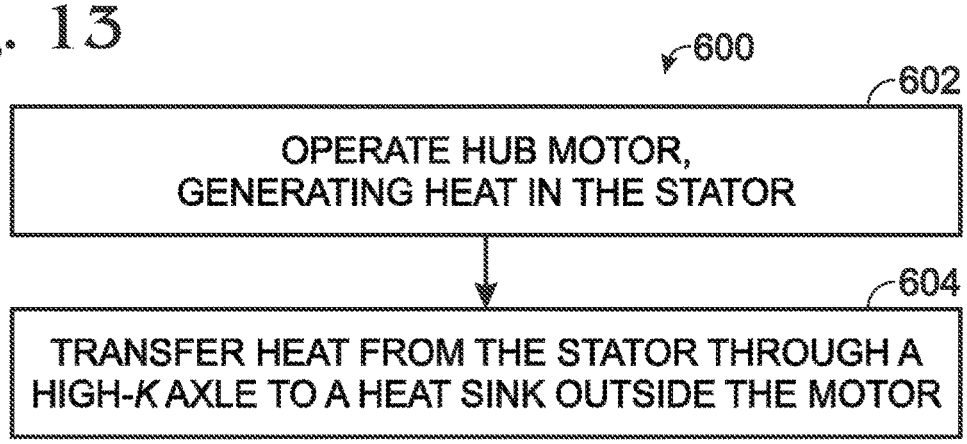
FIG. 13 is a flow chart depicting steps in an illustrative method for reducing heat in a hub motor.

This section describes steps of an illustrative method for reducing heat in a hub motor; see FIG. 13. Aspects of vehicles, hub motors, and/or intermediate articles of manufacture described above may be utilized in the method steps described below. Where appropriate, reference may be made to previously described components and systems that may be used in carrying out each step. These references are for illustration, and are not intended to limit the possible ways of carrying out any particular step of the method.

FIG. 13 is a flowchart illustrating steps performed in an illustrative method, and may not recite the complete process or all steps of the method. FIG. 13 depicts multiple steps of a method, generally indicated at 600, which may be performed in conjunction with thermally enhanced hub motors according to aspects of the present disclosure. Although various steps of method 600 are described below and depicted in FIG. 13, the steps need not necessarily all be performed, and in some cases may be performed in a different order than the order shown.

Step 602 of method 600 includes operating a hub motor, such that an outer rotor rotates around an inner stator of the hub motor, thereby generating heat in the stator. The hub motor is coupled to a device, which may include a vehicle such as vehicle 10, described above. In some examples, the hub motor may be configured to rotate a wheel of the vehicle.

Step 604 of method 600 includes transferring at least a portion of the heat from the stator to a heat sink outside the motor. This is accomplished by conducting heat from the stator to the heat sink through an axle of the motor. The axle has a substantially higher thermal conductivity than the stator, and the heat sink comprises a portion of the device to which the hub motor is mounted. For example, the axle may comprise aluminum or an aluminum alloy, while the stator comprises steel, such as electrical steel, having a much lower thermal conductivity (k).

The heat sink, which may be a portion of the device or vehicle, may comprise a material having a k that is substantially similar to the k of the axle. For example, the portion of the device may function as the heat sink, and may comprise aluminum (e.g., an aluminum alloy). The heat sink may provide a significant volume and/or area useful for dissipating heat transferred to it by the axle.

Illustrative Examples, Features, Combinations

This section describes additional aspects and features of thermally enhanced hub motors, and related methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An electric vehicle comprising:
    a board including a frame supporting first and second deck portions, each deck portion configured to receive a left or right foot of a rider oriented generally perpendicular to a direction of travel of the board;
    a wheel assembly including a rotatable ground-contacting element disposed between and extending above the first and second deck portions;
    a hub motor configured to rotate the ground-contacting element to propel the electric vehicle, the hub motor including
      a rotor;
      a stator disposed within the rotor;
      a motor casing housing the rotor and the stator; and
      an axle extending from the stator through the motor casing, the axle being coupled to the frame of the board;
    wherein the axle comprises aluminum.

A1. The vehicle of A0, wherein the axle extends from opposing sides of the rotor.

A2. The vehicle of any of paragraphs A0 through A1, wherein the frame comprises aluminum.

A3. The vehicle of any of paragraphs A0 through A2, wherein the axle consists of an aluminum alloy.

A4. The vehicle of any of paragraphs A0 through A3, wherein the stator comprises steel.

A5. The vehicle of any of paragraphs A0 through A4, wherein the axle is disposed concentrically within the stator in an interference fit.

A6. The vehicle of A5, wherein the axle includes a mandrel portion and a shaft portion, the mandrel portion having a larger diameter than the shaft portion and in direct contact with the stator.

B0. An electric vehicle comprising:
a board including a frame supporting first and second deck portions, each deck portion configured to receive a left or right foot of a rider oriented generally perpendicular to a direction of travel of the board;
a wheel assembly including a rotatable ground-contacting element disposed between and extending above the first and second deck portions;
a hub motor configured to rotate the ground-contacting element to propel the electric vehicle, the hub motor including
 a rotor,
 a stator disposed concentrically within the rotor, such that the rotor is configured to rotate about the stator, and
 an axle portion coupled to the frame of the board, the axle portion having a central shaft extending axially from a mandrel fixed concentrically within the stator, an outer surface of the mandrel in direct contact with the stator;
wherein the central shaft and the mandrel together form a unit consisting of a single material having a thermal conductivity substantially higher than the stator.

B1. The vehicle of B0, wherein the stator comprises steel, and the unit formed by the central shaft and the mandrel consists of an aluminum alloy.

B2. The vehicle of any of paragraphs B0 through B1, wherein the mandrel is connected to the central shaft by a plurality of radial connection members that are unitary with the mandrel and the central shaft.

B3. The vehicle of any of paragraphs B0 through B2, wherein the mandrel is cylindrical.

B4. The vehicle of any of paragraphs B0 through B3, wherein the axle portion further includes a mounting block, the central shaft being connected to the frame by the mounting block.

B5. The vehicle of any of paragraphs B0 through B4, wherein the central shaft is in direct contact with the frame.

B6. The vehicle of any of paragraphs B0 through B5, wherein the frame comprises the same material as the unit formed by the central shaft and the mandrel.

B7. The vehicle of any of paragraphs B0 through B6, wherein the mandrel has two opposing end portions, and the central shaft extends axially from both of the end portions of the mandrel.

B8. The vehicle of any of paragraphs B0 through B7, wherein the thermal conductivity of the stator is less than approximately 100 Watts per meter per Kelvin (W/mK), and the thermal conductivity of the unit formed by the central shaft and the mandrel is greater than approximately 150 W/mK.

C0. An electric vehicle comprising:
a board including a frame supporting first and second deck portions, each deck portion configured to receive a left or right foot of a rider oriented generally perpendicular to a direction of travel of the board;
a wheel assembly including a rotatable ground-contacting element disposed between and extending above the first and second deck portions;
a hub motor configured to rotate the ground-contacting element to propel the electric vehicle, the hub motor including
 a stator disposed concentrically within the ground-contacting element, and
 an axle portion having a central shaft extending axially from a mandrel fixed concentrically within the stator, an outer surface of the mandrel in direct contact with the stator, the central shaft and the mandrel comprising aluminum;
wherein the axle portion of the hub motor is in thermal communication with the frame of the board.

C1. The vehicle of C0, wherein the central shaft and mandrel comprise an aluminum alloy.

C2. The vehicle of any of paragraphs C0 through C1, wherein the frame of the board comprises aluminum.

C3. The vehicle of any of paragraphs C0 through C2, wherein the mandrel has an outer diameter larger than the central shaft.

C4. The vehicle of C3, wherein the mandrel is cylindrical.

C5. The vehicle of any of paragraphs C0 through C4, wherein the mandrel is connected to the central shaft by a plurality of radial connectors, forming a plurality of lengthwise cavities therebetween.

C6. The vehicle of any of paragraphs C0 through C5, wherein the axle portion of the hub motor is directly coupled to the frame of the board.

C7. The vehicle of any of paragraphs C0 through C6, wherein the axle portion of the hub motor further comprises a connection block, and the central shaft is coupled to the frame of the board through the connection block.

D0. A method for reducing heat in a hub motor, the method comprising:
operating a hub motor, such that an outer rotor rotates around an inner stator of the hub motor, thereby generating heat in the stator; and
transferring at least a portion of the heat from the stator to a heat sink outside the motor, by conducting heat from the stator to the heat sink through an axle of the motor, the axle having a substantially higher thermal conductivity than the stator;
wherein the heat sink comprises a portion of a device to which the hub motor is mounted.

D1. The method of D0, wherein the stator comprises steel and the axle comprises aluminum.

D2. The method of D1, wherein the portion of the device comprises aluminum.

D3. The method of any of paragraphs D0 through D2, wherein the device is a vehicle, and the hub motor is configured to rotate a wheel of the vehicle.

E0. A method of manufacturing an electric hub motor, the method comprising:
extruding an elongate member having an outer surface, an axis, and a first outer diameter, the elongate member comprising aluminum;
machining a first end portion of the extruded member to produce a shaft extending coaxially from a remaining unmachined portion of the elongate member, the shaft having a second outer diameter smaller than the first outer diameter; and
inserting the elongate member into a corresponding central opening in a stator portion of an electric motor, such that the elongate member is coupled to the stator portion in a concentric interference fit and the shaft extends beyond the stator portion.

E1. The method of E0, further including installing the stator portion and elongate member into the electric motor.

E2. The method of any of paragraphs E0 through E1, wherein inserting the elongate member into the stator portion comprises compression shrink fitting.

E3. The method of E2, wherein the elongate member is cooled using a cryogen.

E4. The method of E3, wherein the cryogen comprises liquid nitrogen.

E5. The method of any of paragraphs E0 through E4, wherein the elongate member is cylindrical.

E6. The method of any of paragraphs E0 through E5, wherein the elongate member comprises an outer tube surrounding and connected to an inner shaft, such that at least one lengthwise gap is formed between the outer tube and the inner shaft.

E7. The method of E6, wherein the outer tube is connected to the inner shaft by a plurality of radial members.

F0. An electric hub motor comprising:
a rotor;
a stator disposed within the rotor;
a motor casing housing the rotor and the stator; and
an axle extending from the stator through the motor casing;
wherein the axle comprises aluminum.

F1. The motor of F0, wherein the axle extends from opposing sides of the rotor.

F2. The motor of any of paragraphs F0 through F1, wherein the motor is coupled to a frame member of an apparatus by the axle.

F3. The motor of F2, wherein the frame member comprises aluminum.

F4. The motor of any of paragraphs F0 through F3, wherein the axle consists of an aluminum alloy.

F5. The motor of any of paragraphs F0 through F4, wherein the stator comprises steel.

F6. The motor of any of paragraphs F0 through F5, wherein the axle is disposed concentrically within the stator in an interference fit.

F6. The motor of F5, wherein the axle includes a mandrel portion and a shaft portion, the mandrel portion having a larger diameter than the shaft portion and in direct contact with the stator.

G0. An apparatus comprising:
a frame portion; and
an electric motor including
a rotor,
a stator disposed concentrically within the rotor, such that the rotor is configured to rotate about the stator, and
an axle portion coupled to the frame portion, the axle portion having a central shaft extending axially from a mandrel fixed concentrically within the stator, an outer surface of the mandrel in direct contact with the stator;
wherein the central shaft and the mandrel together form a unit consisting of a single material having a thermal conductivity substantially higher than the stator.

G1. The apparatus of G0, wherein the stator comprises steel, and the unit formed by the central shaft and the mandrel consists of an aluminum alloy.

G2. The apparatus of any of paragraphs G0 through G1, wherein the mandrel is connected to the central shaft by a plurality of radial connection members that are unitary with the mandrel and the central shaft.

G3. The apparatus of any of paragraphs G0 through G2, wherein the mandrel is cylindrical.

G4. The apparatus of any of paragraphs G0 through G3, wherein the axle portion further includes a mounting block, the central shaft being connected to the frame portion by the mounting block.

G5. The apparatus of any of paragraphs G0 through G4, wherein the central shaft is in direct contact with the frame portion.

G6. The apparatus of any of paragraphs G0 through G5, wherein the frame portion comprises the same material as the unit formed by the central shaft and the mandrel.

G7. The apparatus of any of paragraphs G0 through G6, wherein the mandrel has two opposing end portions, and the central shaft extends axially from both of the end portions of the mandrel.

G8. The apparatus of any of paragraphs G0 through G7, wherein the thermal conductivity of the stator is less than approximately 100 W/(mK), and the thermal conductivity of the unit formed by the central shaft and the mandrel is greater than approximately 150 W/(mK).

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. An electric vehicle comprising:
a board including a frame supporting first and second deck portions, each deck portion configured to receive a left or right foot of a rider oriented generally perpendicular to a direction of travel of the board;
a wheel assembly including a rotatable ground-contacting element disposed between and extending above the first and second deck portions;
a hub motor configured to rotate the ground-contacting element to propel the electric vehicle, the hub motor including:
a rotor;
a stator disposed within the rotor;
a motor casing housing the rotor and the stator;
an axle formed as a single piece and including a shaft portion and a mandrel portion having a larger diameter than the shaft portion, the mandrel portion in direct contact with the stator and the shaft portion extending from the stator through the motor casing, the shaft portion of the axle being coupled to the frame of the board;
wherein the axle comprises aluminum.

2. The vehicle of claim 1, wherein the axle extends from opposing sides of the stator.

3. The vehicle of claim 1, wherein the frame comprises aluminum.

4. The vehicle of claim 1, wherein the axle consists of an aluminum alloy.

5. The vehicle of claim 1, wherein the mandrel of the axle is disposed concentrically within the stator in an interference fit.

6. An electric vehicle comprising:
a board including a frame supporting first and second deck portions, each deck portion configured to receive a left or right foot of a rider oriented generally perpendicular to a direction of travel of the board;
a wheel assembly including a rotatable ground-contacting element disposed between and extending above the first and second deck portions;
a hub motor configured to rotate the ground-contacting element to propel the electric vehicle, the hub motor including:
a rotor,
a stator disposed concentrically within the rotor, such that the rotor is configured to rotate about the stator, and
an axle portion formed as a single piece and coupled to the frame of the board, the axle portion having a central shaft extending axially from a mandrel fixed concentrically within the stator, an outer surface of the mandrel in direct contact with the stator;
wherein the axle portion consists of a single material having a thermal conductivity substantially higher than the stator, and the mandrel is connected to the central shaft by a plurality of radial connection members that are unitary with the mandrel and the central shaft.

7. The vehicle of claim 6, wherein the stator comprises steel, and the unit formed by the central shaft and the mandrel consists of an aluminum alloy.

8. The vehicle of claim 6, wherein the mandrel is cylindrical.

9. The vehicle of claim 6, wherein the central shaft is in direct contact with the frame.

10. The vehicle of claim 6, wherein the mandrel has two opposing end portions, and the central shaft extends axially from both of the end portions of the mandrel.

11. An electric vehicle comprising:
a board including a frame supporting first and second deck portions, each deck portion configured to receive a left or right foot of a rider oriented generally perpendicular to a direction of travel of the board;
a wheel assembly including a rotatable ground-contacting element disposed between and extending above the first and second deck portions;
a hub motor configured to rotate the ground-contacting element to propel the electric vehicle, the hub motor including:
a stator disposed concentrically within the ground-contacting element, and
an axle portion formed as a single piece having a central shaft extending axially from a mandrel fixed concentrically within the stator, the mandrel having an outer diameter larger than the central shaft, an outer surface of the mandrel in direct contact with the stator, the central shaft and the mandrel comprising aluminum;
wherein the axle portion of the hub motor is in thermal communication with the frame of the board.

12. The vehicle of claim 11, wherein the central shaft and mandrel comprise an aluminum alloy.

13. The vehicle of claim 11, wherein the frame of the board comprises aluminum.

14. The vehicle of claim 11, wherein the mandrel has an outer diameter larger than the central shaft.

15. The vehicle of claim 14, wherein the mandrel is cylindrical.

16. The vehicle of claim 11, wherein the mandrel is connected to the central shaft by a plurality of radial connectors unitary with the mandrel and the central shaft, the plurality of radial connectors forming a plurality of lengthwise cavities therebetween.

17. The vehicle of claim 11, wherein the axle portion of the hub motor is directly coupled to the frame of the board.

18. The vehicle of claim 11, wherein the axle portion of the hub motor further comprises a connection block, and the central shaft is coupled to the frame of the board through the connection block.

* * * * *